United States Patent
Broker et al.

(10) Patent No.: US 10,239,403 B2
(45) Date of Patent: Mar. 26, 2019

(54) CONCRETE MIXER VEHICLE HAVING VERTICALLY-POSITIONED CNG FUEL TANKS

(71) Applicant: Oshkosh Corporation, Oshkosh, WI (US)

(72) Inventors: Mark D. Broker, Neenah, WI (US);
Tim S. Meilahn, Oshkosh, WI (US);
Jon J. Morrow, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 492 days.

(21) Appl. No.: 14/635,948

(22) Filed: Mar. 2, 2015

(65) Prior Publication Data

US 2015/0246331 A1    Sep. 3, 2015

Related U.S. Application Data

(60) Provisional application No. 61/947,079, filed on Mar. 3, 2014.

(51) Int. Cl.
| | |
|---|---|
| *B60K 15/063* | (2006.01) |
| *B60K 15/07* | (2006.01) |
| *B28C 5/42* | (2006.01) |
| *B60P 3/16* | (2006.01) |

(52) U.S. Cl.
CPC ........... *B60K 15/063* (2013.01); *B28C 5/421* (2013.01); *B60K 15/07* (2013.01); *B60P 3/16* (2013.01); *B60Y 2200/14* (2013.01); *B60Y 2200/41* (2013.01)

(58) Field of Classification Search
CPC ..... B01F 13/0037; B28C 5/42; B28C 5/4203; B28C 5/421; B60K 15/063; B60K 15/067; B60K 15/07; B60P 3/16
USPC ........................................................ 366/62
See application file for complete search history.

(56) References Cited

U.S. PATENT DOCUMENTS

| | | | |
|---|---|---|---|
| 3,038,704 A * | 6/1962 | Cook | .................... B28C 5/4203 |
| | | | 280/149.2 |
| 5,538,274 A | 7/1996 | Schmitz et al. | |
| 5,820,150 A | 10/1998 | Archer et al. | |
| 6,036,352 A | 3/2000 | Sakamoto | |
| 6,105,984 A | 8/2000 | Schmitz et al. | |
| 6,421,593 B1 | 7/2002 | Kempen et al. | |
| 6,516,914 B1 | 2/2003 | Andersen et al. | |
| 6,520,494 B1 | 2/2003 | Andersen et al. | |

(Continued)

FOREIGN PATENT DOCUMENTS

DE         3018394 A1 * 11/1981  ........... B28C 5/4255

OTHER PUBLICATIONS

NGV Journal, "First CNG-powered front discharge concrete-mixer truck tested in Indiana," http://www.ngvjournal.com/first-cng-powered-front-discharge-concrete-mixer-truck-tested-in-indiana/, dated Jun. 28, 2012, accessed Apr. 26, 2017.*

(Continued)

*Primary Examiner* — Marc C Howell
(74) *Attorney, Agent, or Firm* — Foley & Lardner LLP

(57) ABSTRACT

A concrete mixer vehicle includes a chassis having a frame member extending in a generally-horizontal direction, an engine coupled to the chassis, and a CNG tank coupled to the engine and configured to provide fuel thereto. The CNG tank is positioned in a generally-vertical orientation relative to the frame member.

13 Claims, 9 Drawing Sheets

(56) References Cited

U.S. PATENT DOCUMENTS

| | | |
|---|---|---|
| 6,553,290 B1 | 4/2003 | Pillar |
| 6,561,718 B1 | 5/2003 | Archer et al. |
| 6,757,597 B2 | 6/2004 | Yakes et al. |
| 6,764,085 B1 | 7/2004 | Anderson |
| 6,860,332 B1 | 3/2005 | Archer et al. |
| 6,882,917 B2 | 4/2005 | Pillar et al. |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,976,688 B2 | 12/2005 | Archer et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,073,847 B2 | 7/2006 | Morrow et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,234,534 B2 | 6/2007 | Froland et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,520,354 B2 | 4/2009 | Morrow et al. |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,792,949 B2 | 9/2010 | Tewari et al. |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,931,103 B2 | 4/2011 | Morrow et al. |
| 7,931,397 B2 | 4/2011 | Datema |
| 8,000,850 B2 | 8/2011 | Nasr et al. |
| 8,095,247 B2 | 1/2012 | Pillar et al. |
| 8,337,352 B2 | 12/2012 | Morrow et al. |
| 8,534,403 B2 | 9/2013 | Pursifull |
| 8,561,735 B2 | 10/2013 | Morrow et al. |
| 8,864,613 B2 | 10/2014 | Morrow et al. |
| 2003/0158635 A1 | 8/2003 | Pillar et al. |
| 2003/0195680 A1 | 10/2003 | Pillar |
| 2004/0133319 A1 | 7/2004 | Pillar et al. |
| 2005/0087971 A1* | 4/2005 | Studebaker ............ B62D 21/02 280/781 |
| 2005/0113996 A1 | 5/2005 | Pillar et al. |
| 2008/0007096 A1* | 1/2008 | Fleming ............... B60K 15/063 296/204 |
| 2008/0059030 A1 | 3/2008 | Quigley et al. |
| 2008/0103651 A1 | 5/2008 | Pillar et al. |
| 2008/0215190 A1 | 9/2008 | Pillar et al. |
| 2008/0215700 A1 | 9/2008 | Pillar et al. |
| 2008/0221741 A1 | 9/2008 | Pillar et al. |
| 2010/0301668 A1 | 12/2010 | Yakes et al. |
| 2013/0021867 A1 | 1/2013 | Shimizu |

OTHER PUBLICATIONS

McNeilus, "McNeilus booth at world of concrete headlined by CNG-powered Oshkosh S-Series front discharge mixer," https://www.mcneiluscompanies.com/mcneilus-booth-world-concrete-headlined-cng-powered-oshkosh-s-series-front-discharge-mixer/, dated Feb. 5, 2013, accessed Apr. 26, 2017.*

U.S. Appl. No. 08/046,623, filed Apr. 14, 1993, Schmitz et al.

U.S. Appl. No. 09/123,804, filed Jul. 28, 1998, Archer et al.

U.S. Appl. No. 09/364,690, filed Jul. 30, 1999, Kempen et al.

S-Series CNG Mixer Product Images, product available as of at least Feb. 17, 2014, 3 pages.

* cited by examiner

US 10,239,403 B2

CONCRETE MIXER VEHICLE HAVING VERTICALLY-POSITIONED CNG FUEL TANKS

CROSS-REFERENCE TO RELATED PATENT APPLICATIONS

This application claims the benefit of U.S. Provisional Application No. 61/947,079, filed Mar. 3, 2014, which is incorporated herein by reference in its entirety.

BACKGROUND

A concrete mixer vehicle is used to transport concrete (e.g., ready mix concrete) from a mixing location (e.g., a concrete batch plant) to a point of use. The concrete mixer vehicle may be a front discharge concrete mixer vehicle or a rear discharge concrete mixer vehicle, which dispense concrete from the front or rear of the vehicle, respectively. An engine is used to move the vehicle, and a fuel system provides fuel to power the engine. Traditionally, the engine combusts diesel fuel to provide an output power. Other concrete mixer vehicles include engines powered by compressed natural gas (CNG). CNG is stored in CNG fuel tanks and provided to the engine to power the vehicle.

SUMMARY

One embodiment relates to a concrete mixer vehicle that includes a chassis having a frame member extending in a generally-horizontal direction, an engine coupled to the chassis, and a CNG tank coupled to the engine and configured to provide fuel thereto. The CNG tank is positioned in a generally-vertical orientation relative to the frame member.

Another embodiment relates to a front discharge concrete mixer vehicle that includes a chassis including a frame member extending in a generally-horizontal direction and having a front end and a rear end, a concrete mixing drum having an opening at the front end of the chassis and coupled to the frame member with a front drum pedestal and a rear drum pedestal, an operator cab positioned at the front end of the chassis, an engine positioned at the rear end of the chassis, and a CNG tank coupled to the engine and configured to provide fuel thereto. The CNG tank is positioned in a generally-vertical orientation relative to the frame member.

Still another embodiment relates to a rear discharge concrete mixer vehicle that includes a chassis including a frame member extending in a generally-horizontal direction and having a front end and a rear end, a concrete mixing drum having an opening at the rear end of the chassis and coupled to the frame member with a front drum pedestal and a rear drum pedestal, an operator cab positioned at the front end of the chassis, an engine positioned at the front end of the chassis, and a CNG tank coupled to an engine and configured to provide fuel thereto. The CNG tank is positioned in a generally-vertical orientation relative to the frame member.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

According to an exemplary embodiment, a concrete mixer vehicle includes a pair of CNG fuel tanks positioned in a generally-vertical orientation. The concrete mixer vehicle including CNG fuel tanks positioned in a generally-vertical orientation has a shorter wheelbase than CNG-fueled concrete mixer vehicles having CNG fuel tanks positioned along the length of the chassis or laterally across the length of the chassis. The concrete mixer vehicle having a shorter wheelbase is more maneuverable (e.g., around a jobsite, etc.). By way of example, the concrete mixer vehicle having a shorter wheelbase may have a smaller turning radius than other concrete mixer vehicles. In other embodiments, a CNG fuel system including CNG fuel tanks positioned in a generally-vertical orientation is configured to be provided for use with a concrete mixer vehicle. The concrete mixer vehicle may have a shorter wheelbase (e.g., relative to CNG-fueled concrete mixer vehicles having CNG fuel tanks that are otherwise positioned, etc.). In other embodiments, the concrete mixer vehicle may have a maximum allowable wheelbase (e.g., due to governmental or other regulations, due to customer demands, etc.), where extension of the wheelbase to accommodate CNG fuel tanks that are otherwise positioned is not permitted.

Figure 4:
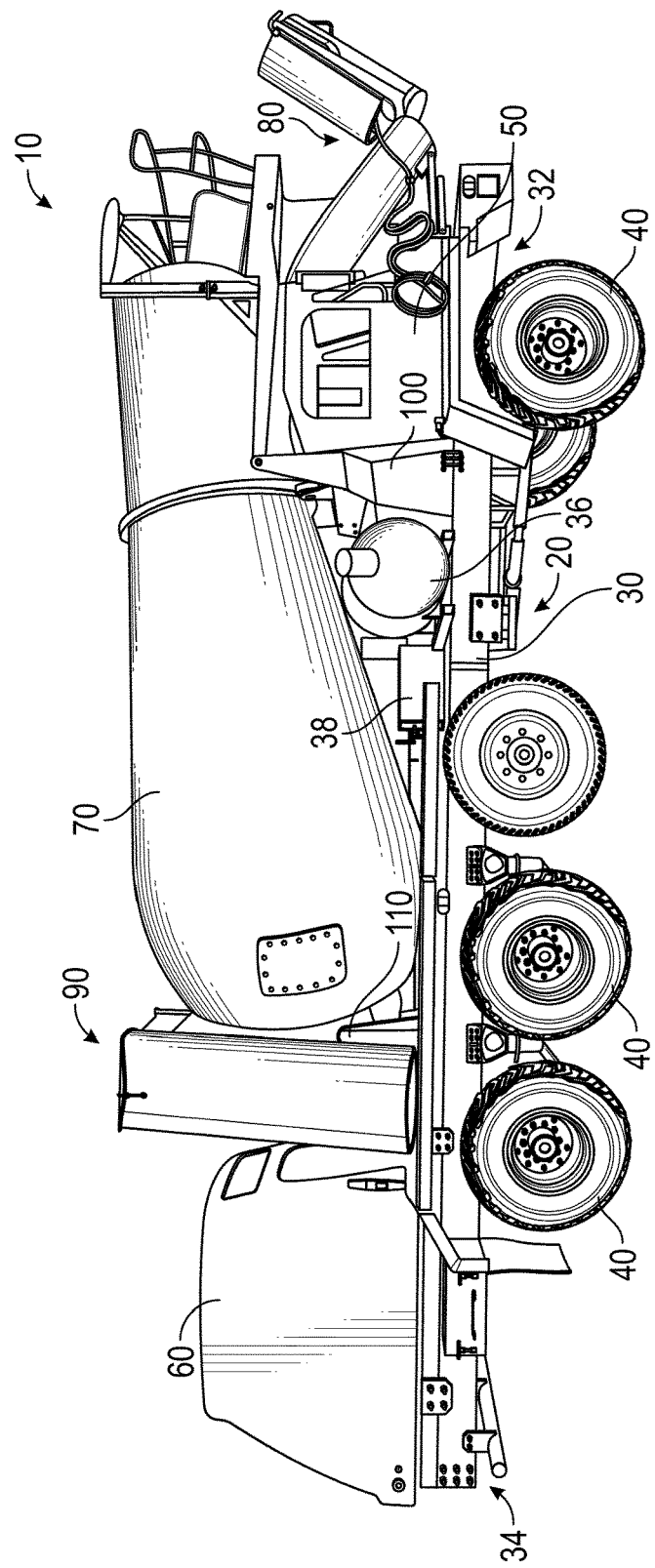
FIG. 4 is a left side perspective view of a concrete mixer vehicle, according to an exemplary embodiment.

According to the exemplary embodiment shown in FIGS. 1-4, a vehicle, shown as concrete mixer truck 10, is configured to transport concrete from a mixing location to a point of use. As shown in FIGS. 1-4, concrete mixer truck 10 is a front discharge concrete mixer vehicle. According to an alternative embodiment, concrete mixer truck 10 is a rear discharge concrete mixer vehicle. Concrete mixer truck 10 includes a chassis 20 to support the various components that transport concrete. As shown in FIGS. 1-4, chassis 20 includes a frame member, shown as frame rail 30, and a plurality of motive members, shown as wheel and tire assemblies 40. Chassis 20 includes a pair of frame rails 30 coupled with intermediate cross members, according to an exemplary embodiment. As shown in FIG. 4, frame rails 30 extend in a generally-horizontal direction (e.g., extend within 10 degrees of perpendicular relative to a vertical direction, extend within ten degrees of parallel relative to a ground surface when concrete mixer truck 10 is positioned on flat ground, etc.) and have front ends 32 and rear ends 34. Frame rails 30 may be elongated "C"-channels or tubular members, according to various exemplary embodiments. In other embodiments, the frame member includes another type of structure element (e.g., monocoque, a hull, etc.). In still other embodiments, the frame member includes a combination of elongated C-channels, tubular members, a monocoque element, and/or a hull element.

Figure 1:
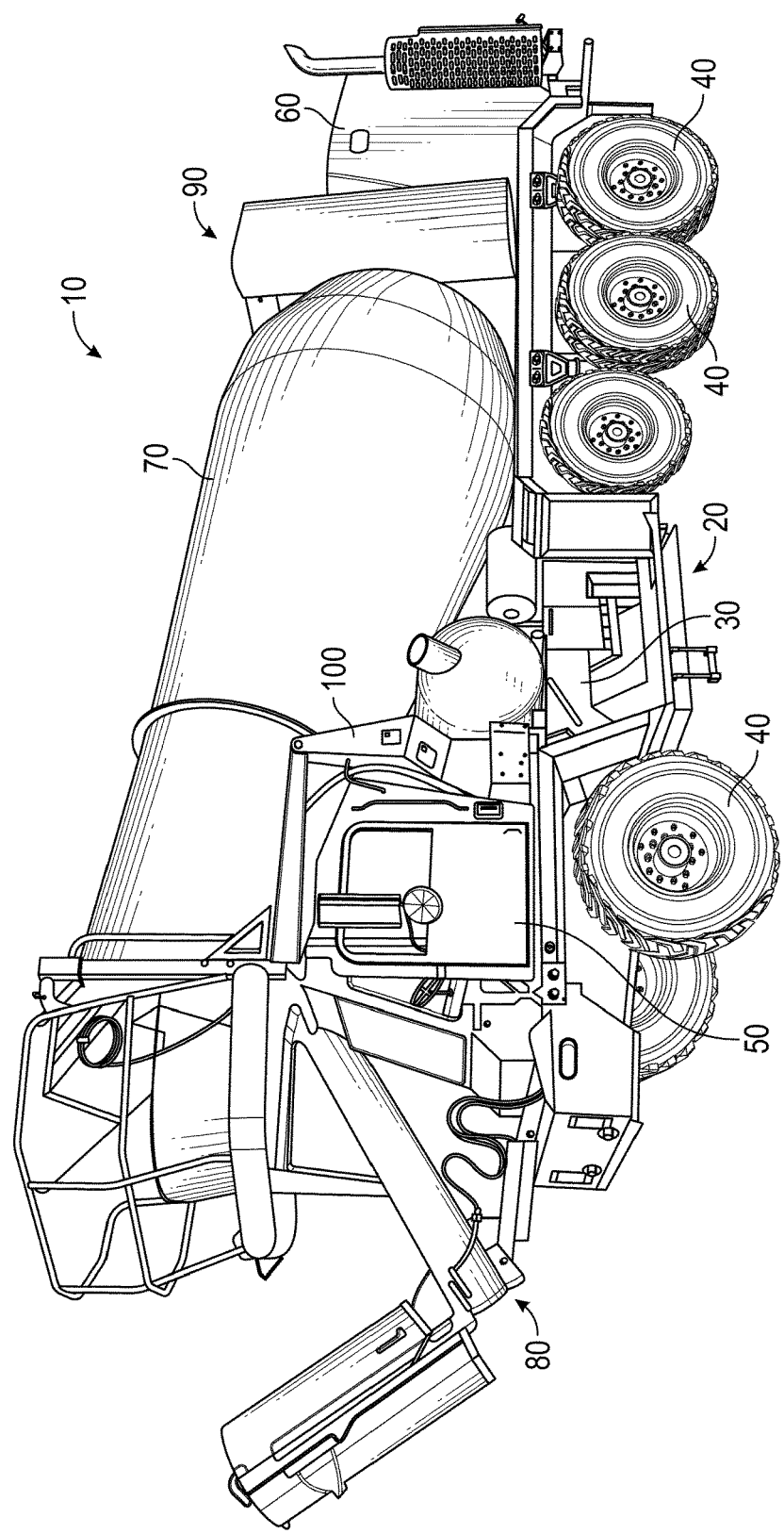
FIG. 1 is a front perspective view of a concrete mixer vehicle, according to an exemplary embodiment.
Figure 2:
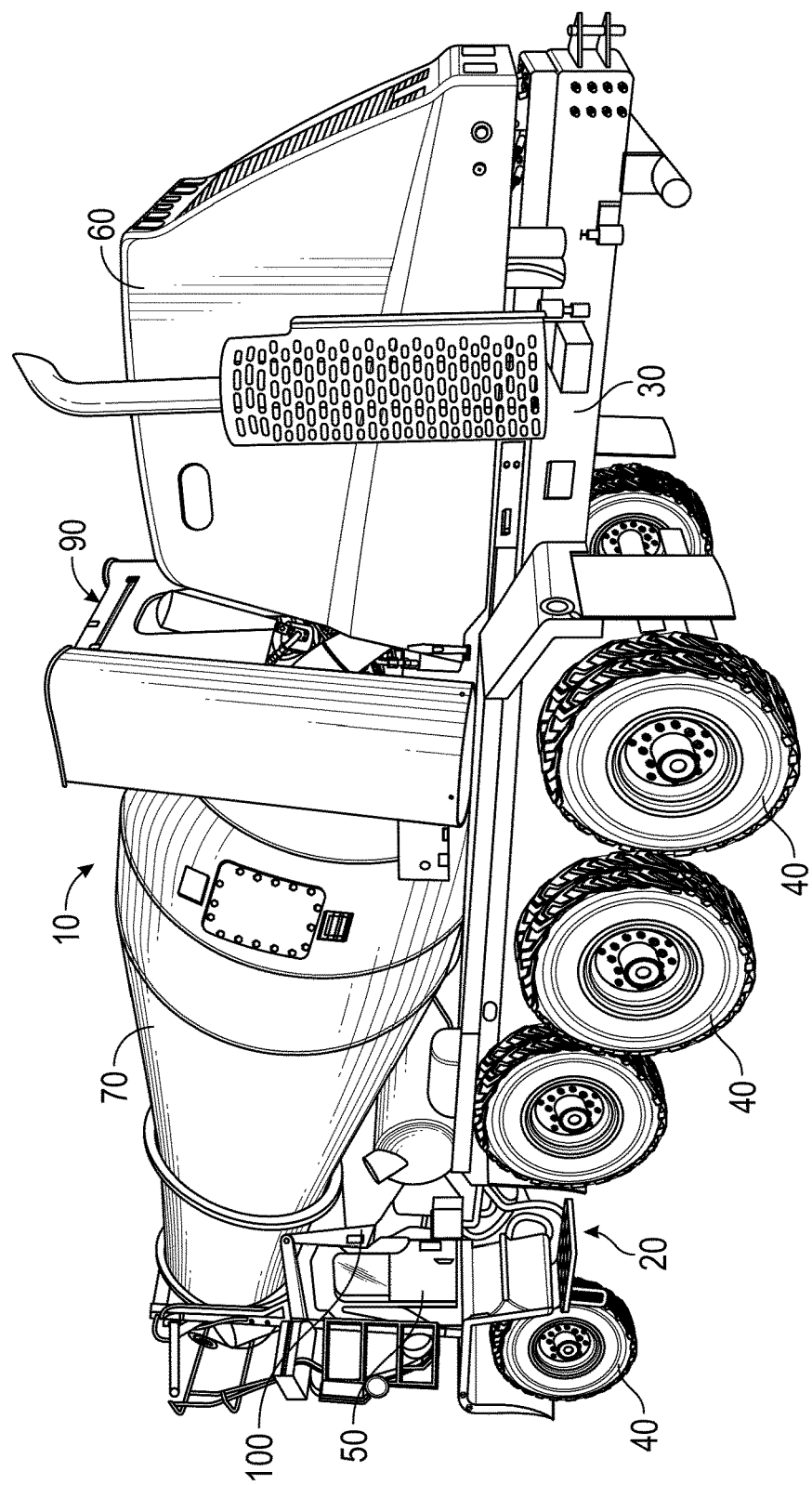
FIG. 2 is a rear perspective view of a concrete mixer vehicle, according to an exemplary embodiment.
Figure 3:
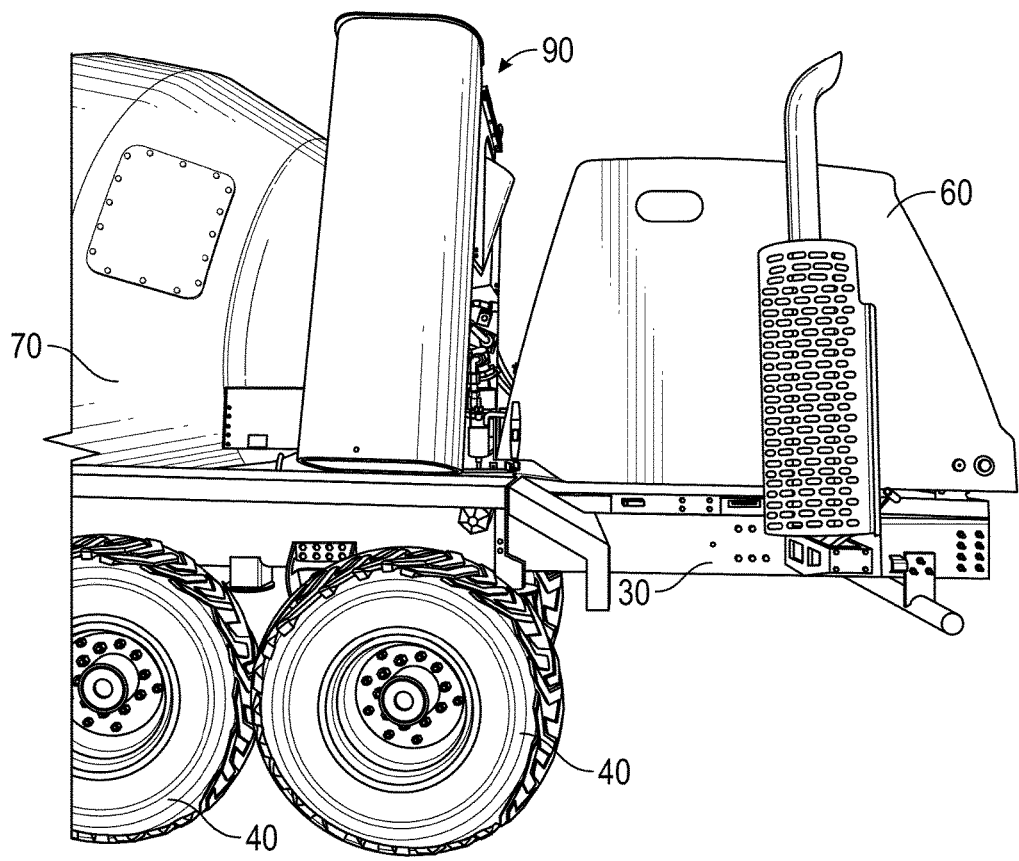
FIG. 3 is a partial right side perspective view of a concrete mixer vehicle, according to an exemplary embodiment.

According to the exemplary embodiment shown in FIGS. 1-4, concrete mixer truck 10 includes an operator cab, shown as cab 50, an engine module, shown as engine module 60, and a concrete mixing drum, shown as mixing drum 70. Cab 50 and engine module 60 are coupled to chassis 20, according to an exemplary embodiment. As shown in FIG. 1, cab 50 is coupled to front end 32 of frame rail 30, and engine module 60 is positioned at rear end 34 of frame rail 30. Mixing drum 70 extends longitudinally along the length of concrete mixer truck 10. According to an exemplary embodiment, mixing drum 70 is angled relative to frame rail 30 (e.g., when viewed from the side of concrete mixer truck 10, etc.). Mixing drum 70 may include a front end that extends over cab 50. A chute assembly 80 is used to direct concrete dispensed from mixing drum 70 to a target location.

Referring still to the exemplary embodiment shown in FIGS. 1-4, a fuel system, shown as fuel system 90, is coupled to chassis 20 and configured to provide CNG to engine module 60. In other embodiments, fuel system 90 is configured to store CNG for use by another vehicle or is configured to provide CNG fuel to another device. By way of example, fuel system 90 may be configured to provide CNG fuel to an engine used to generate electricity (e.g., to produce export power, to power onboard electric motors used to at least one of rotate wheel and tire assemblies 40 and rotate mixing drum 70, etc.). By way of another example, fuel system 90 may be configured to provide CNG fuel to an onboard fuel cell. While shown incorporated as part of concrete mixer truck 10, according to various alternative embodiments, fuel system 90 may be implemented on another type of vehicle (e.g., a military vehicle, a fire apparatus, a lift device, a refuse vehicle, a tow truck, etc.).

As shown in FIG. 4, mixing drum 70 is coupled to frame rails 30 with a front drum pedestal, shown as front pedestal 100, and a rear drum pedestal, shown as rear pedestal 110. Mixing drum 70 may be rotatably coupled to front pedestal 100 (e.g., with a plurality of wheels or rollers, etc.) and rear pedestal 110 (e.g., with a drum drive transmission, etc.). In other embodiments, mixing drum 70 is otherwise coupled to frame rails 30.

Referring again to FIG. 4, concrete mixer truck 10 includes a water tank 36 and an air tank 38. Water tank 36 and air tank 38 are coupled to frame rails 30, according to an exemplary embodiment. As shown in FIG. 4, water tank 36 extends laterally across the length of chassis 20, and air tank 38 extends along the length of chassis 20. In other embodiments, water tank 36 and air tank 38 are otherwise positioned. Water tank 36 may be used to wash concrete mixer truck 10 after pouring a concrete load and/or to add water to the concrete at the construction site, among other uses. Air tank 38 may be coupled to an air system of concrete mixer truck 10 (e.g., as part of a pneumatic braking system, etc.).

Figure 5:
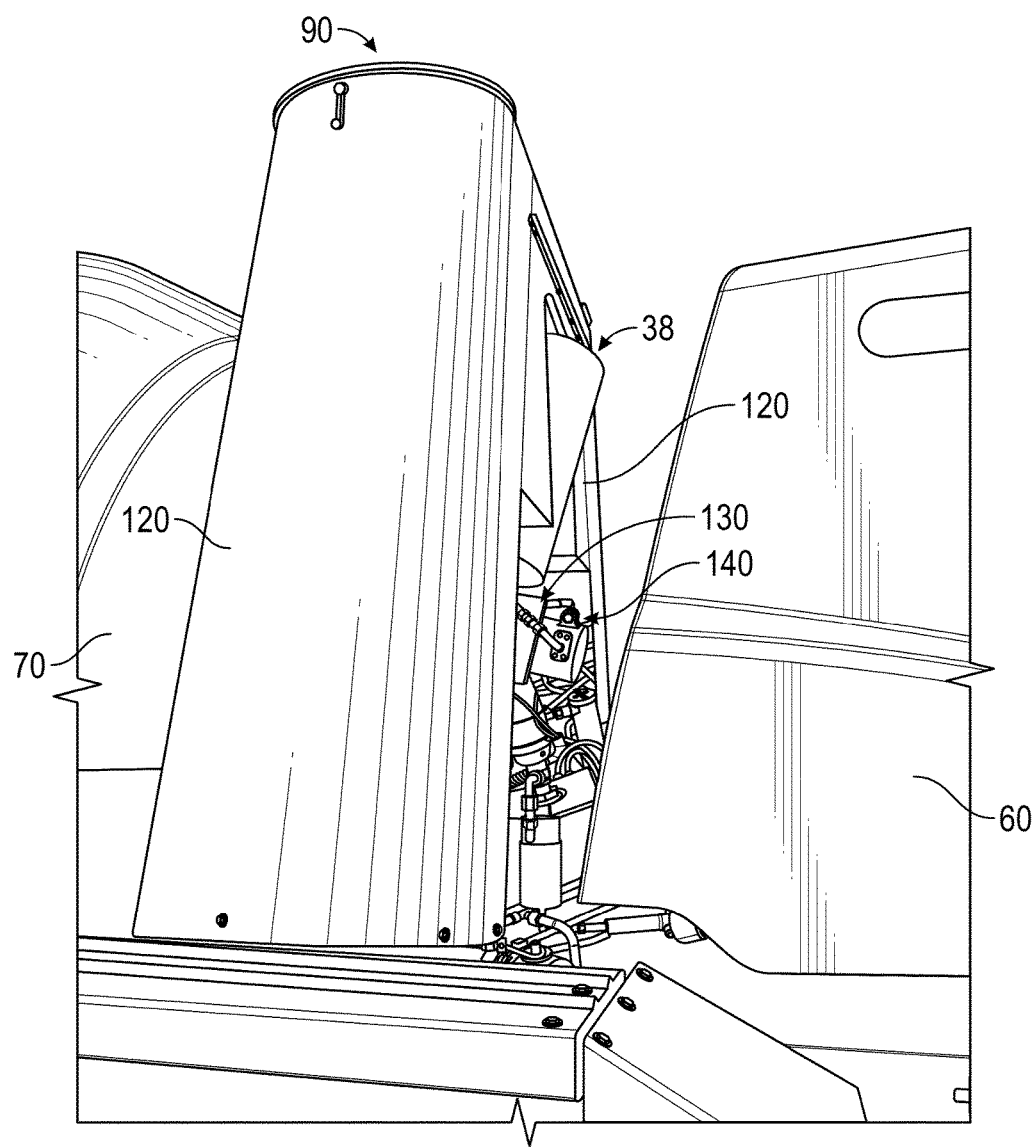
FIG. 5 is a perspective view of a fuel system for a concrete mixer vehicle, according to an exemplary embodiment.
Figure 6:
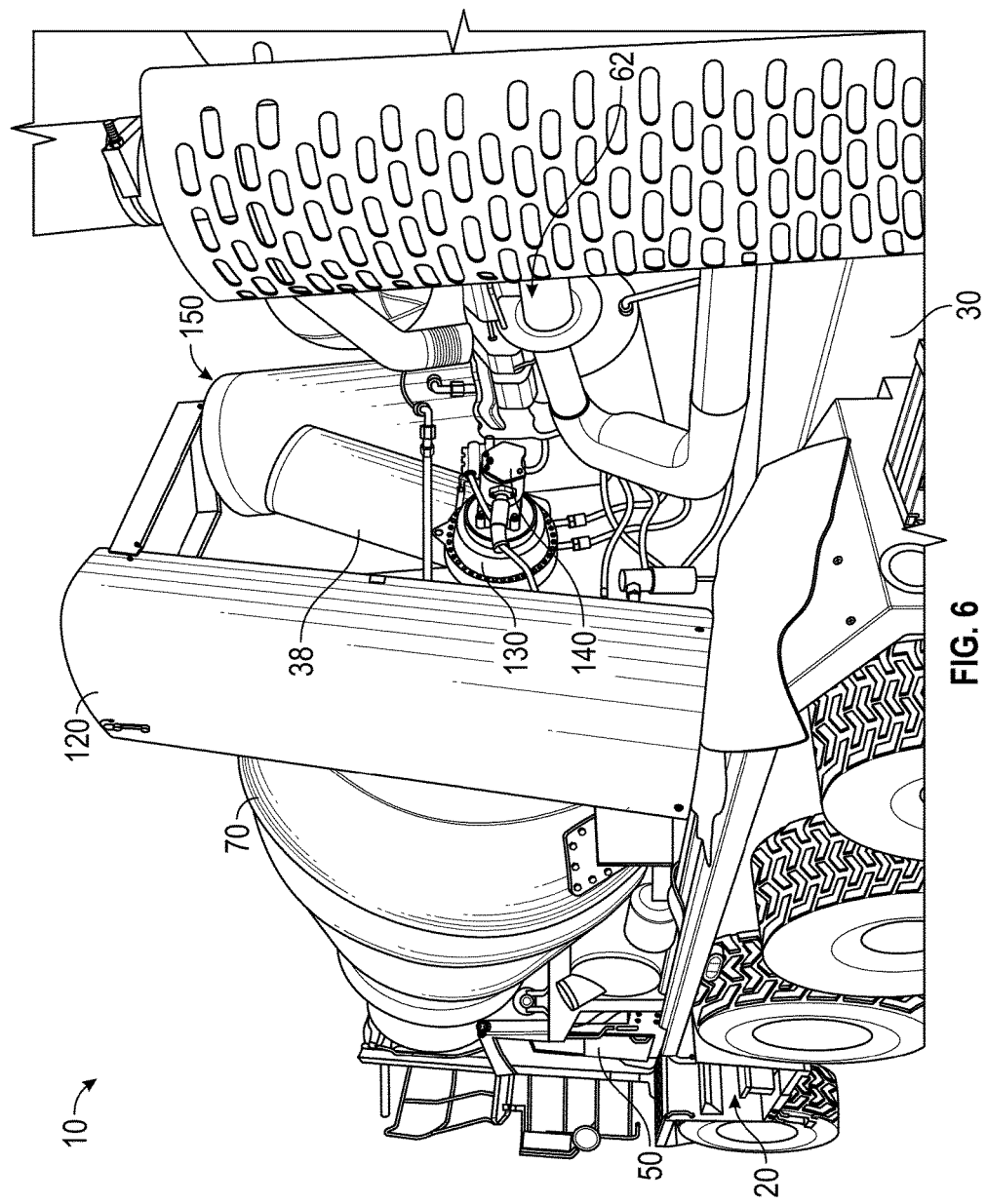
FIG. 6 is a rear perspective view of a concrete mixer vehicle, according to an exemplary embodiment.

Referring next to FIGS. 5-9, fuel system 90 includes various components configured to store and provide fuel to an engine 62 of engine module 60. In one embodiment, engine 62 is coupled to rear ends 34 of frame rails 30. As shown in FIGS. 5-6, fuel system 90 includes a pair of covers 120 that protect various internal components from debris. Covers 120 may satisfy one or more regulatory requirements to which concrete mixer truck 10 is subjected. In other embodiments, fuel system 90 includes a single cover 120. By way of example, covers 120 may protect at least one of internal CNG tanks, an additional air tank 38, a drum drive transmission 130, and a drum drive motor 140 from debris. Such debris may be encountered while concrete mixer truck 10 is driven along a roadway, by way of example. Covers 120 may also protect the various internal components (e.g., internal CNG tanks, etc.) from damage due to collisions with trees, poles, or other structures at a jobsite or while transporting concrete.

Figure 7:
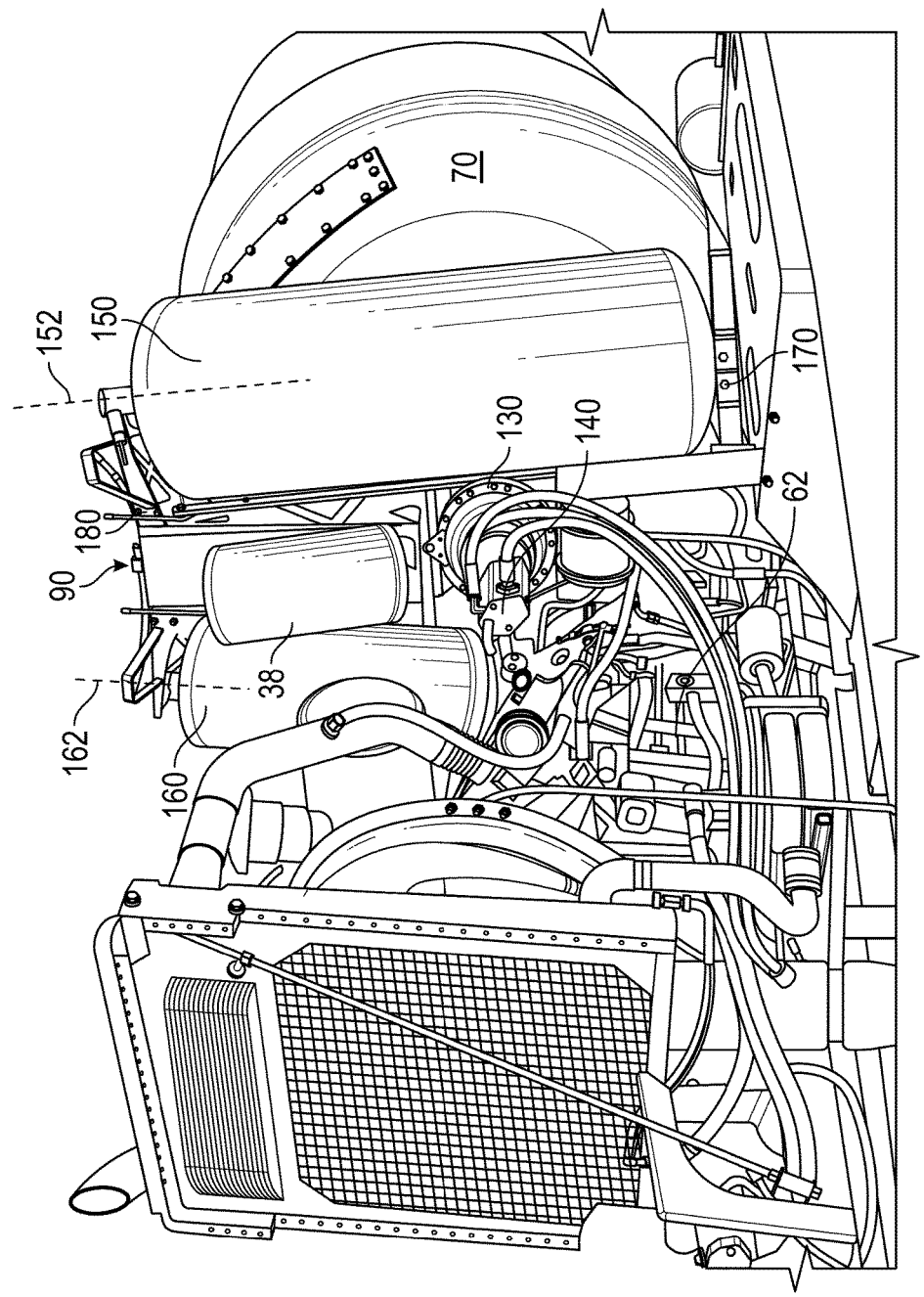
FIGS. 7-8 are perspective views of a fuel system for a concrete mixer vehicle including a plurality of CNG tanks positioned in a generally-vertical orientation, according to an exemplary embodiment.
Figure 8:
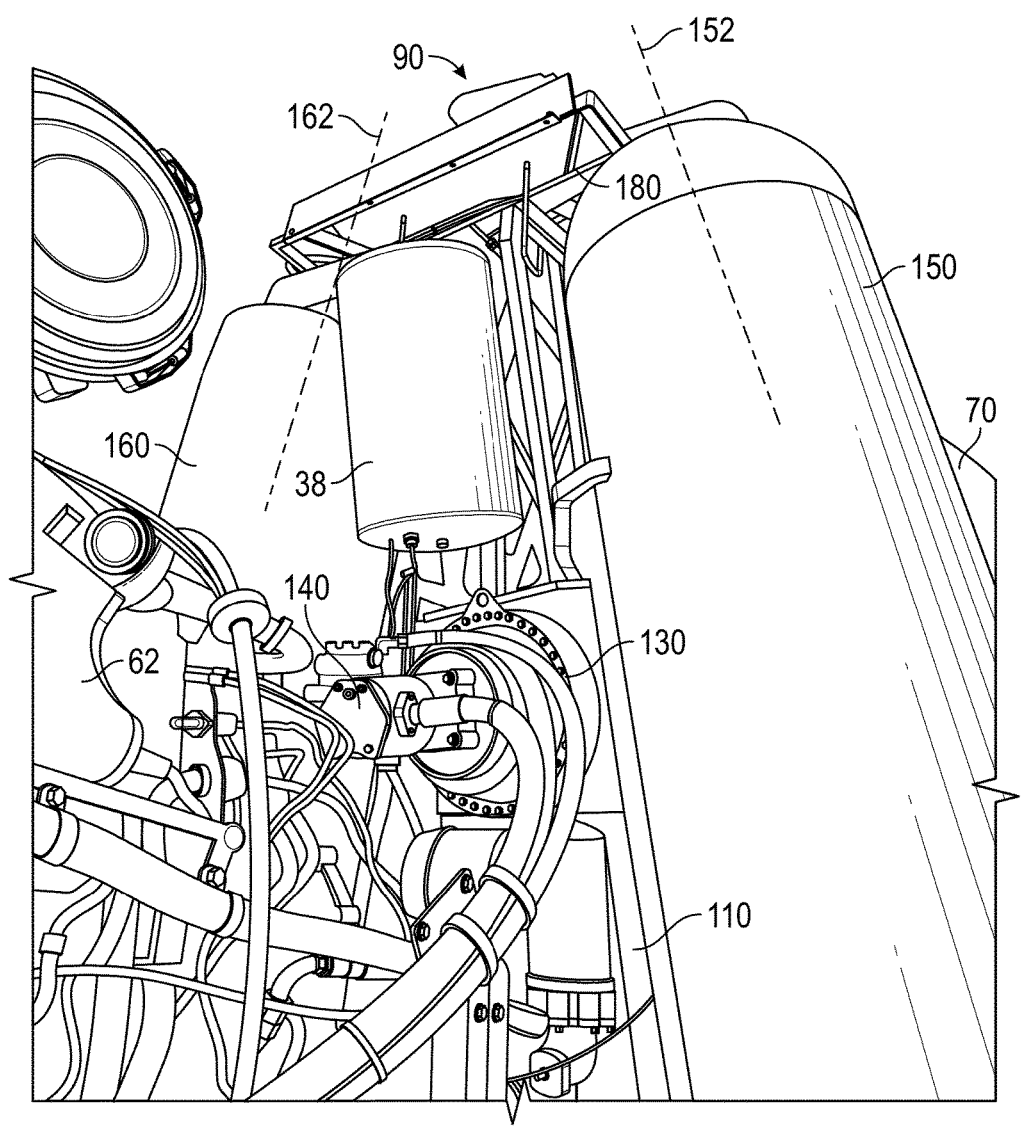

As shown in FIG. 8, drum drive transmission 130 is coupled to a base portion of mixing drum 70, and drum drive motor 140 is coupled to drum drive transmission 130. According to the exemplary embodiment shown in FIG. 8, drum drive motor 140 is a hydraulic motor. In other embodiments, drum drive motor 140 is another type of actuator (e.g., an electric motor, etc.). Drum drive motor 140 is configured to provide an output torque to drum drive transmission 130, according to an exemplary embodiment, which rotates mixing drum 70 about a central axis. As shown in FIGS. 6-8, drum drive transmission 130 extends rearward (i.e., toward the rear of concrete mixer truck 10, toward engine module 60, etc.) from the base portion of mixing drum 70, and drum drive motor 140 extends rearward from drum drive transmission 130.

Figure 9:
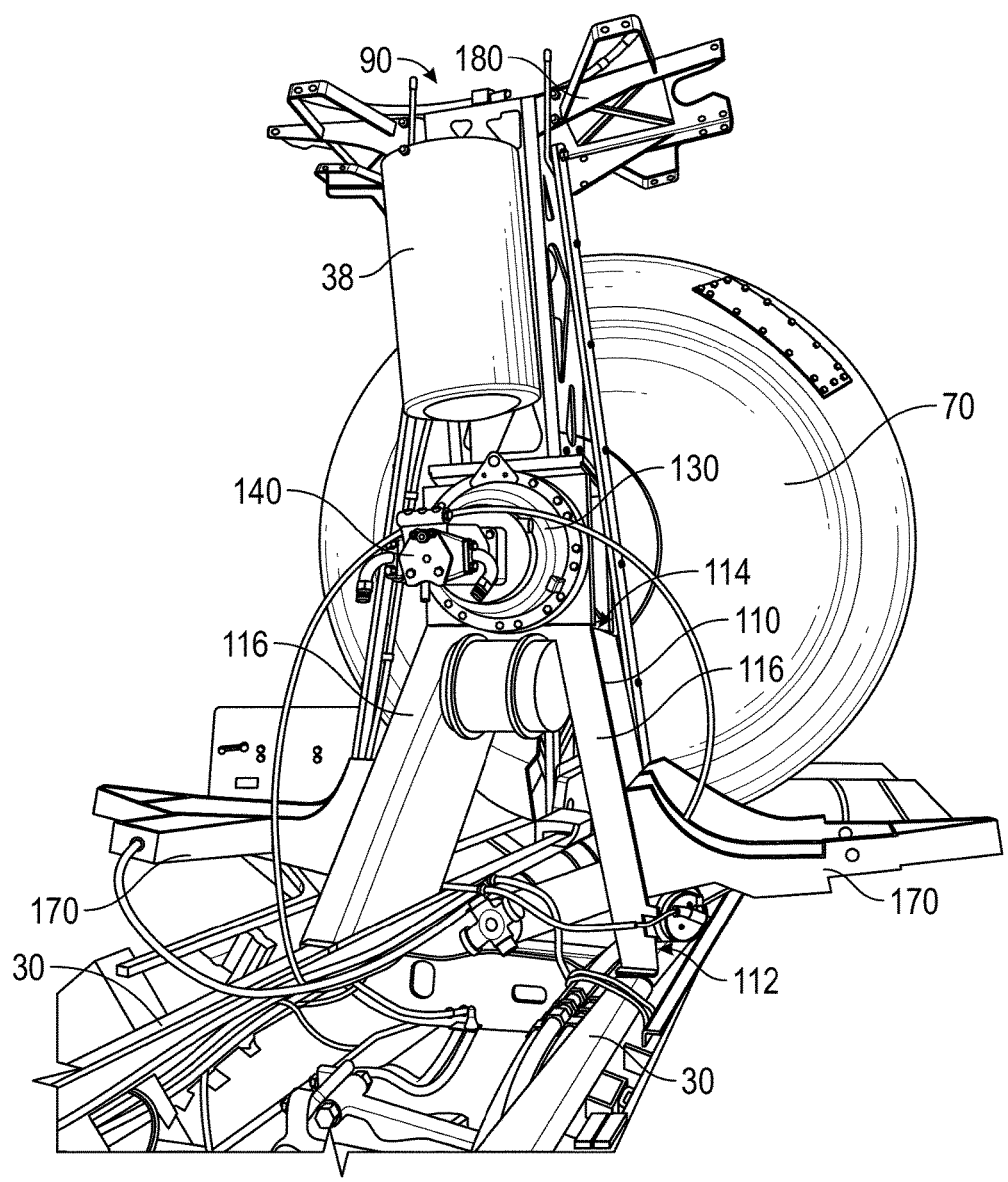
FIG. 9 is a perspective view of a CNG tank mounting structure for a concrete mixer vehicle, according to an exemplary embodiment.

Drum drive transmission 130 includes a plurality of gears (e.g., a planetary gear reduction set, etc.) configured to increase the turning torque applied to mixing drum 70, according to an exemplary embodiment. The plurality of gears may be disposed within a housing. As shown in FIGS. 8-9, rear pedestal 110 includes a lower portion 112 and an upper portion 114. In one embodiment, lower portion 112 is coupled to frame rails 30, and a bottom interface of drum drive transmission 130 (e.g., a bottom portion of the housing, etc.) is coupled to upper portion 114. As shown in FIG. 9, rear pedestal 110 includes a pair of legs 116 extending between frame rails 30 and drum drive transmission 130.

Referring again to FIGS. 7-9, fuel system 90 includes a first CNG tank 150 (e.g., a first CNG cylinder, etc.) and a second CNG tank 160 (e.g., a second CNG cylinder, etc.). In one embodiment, first CNG tank 150 and second CNG tank 160 are coupled to engine 62 and configured to provide fuel thereto (e.g., by storing CNG fuel, etc.). Covers 120 at least partially surround (e.g., envelop, wrap around, etc.) first CNG tank 150 and second CNG tank 160, according to an exemplary embodiment, and reduce the risk of damage thereto (e.g., due to road debris or collisions, etc.). According to an alternative embodiment, fuel system 90 does not include covers 120.

As shown in FIGS. 6-8, first CNG tank 150 and second CNG tank 160 are positioned in a generally-vertical orientation. In one embodiment, first CNG tank 150 and second CNG tank 160 are positioned in a generally-vertical orientation relative to frame rails 30. By way of example, first CNG tank 150 and second CNG tank 160 may be positioned generally perpendicular to frame rails 30 when viewed from the side of concrete mixer truck 10. By way of another example, first CNG tank 150 and second CNG tank 160 may be generally orthogonal to a plane extending through a portion of each frame rail 30. By way of still another example, first CNG tank 150 and second CNG tank 160 may be generally orthogonal to a flat ground surface upon which concrete mixer truck 10 is positioned.

According to an exemplary embodiment, fuel system 90 includes valves, hoses, regulators, filters, and various other components configured to facilitate providing fuel to engine 62. Such components may be coupled to first CNG tank 150 and second CNG tank 160 with a plurality of CNG connections (e.g., high pressure connections, low pressure connections, etc.). In one embodiment, fuel system 90 includes exactly two CNG storage tanks. Having two CNG storage tanks reduces the number of CNG connections within fuel system 90, thereby reducing the risk of leaking CNG from fuel system 90 to the surrounding environment.

In other embodiments, fuel system 90 includes more than two CNG storage tanks (e.g., three CNG storage tanks, four CNG storage tanks, etc.) or fewer than two CNG storage tanks. The CNG storage tanks may be each positioned in a generally-vertical orientation, or at least one of the CNG storage tanks may be positioned laterally across frame rails 30, according to alternative embodiments. By way of example, two CNG storage tanks may be positioned in a generally-vertical orientation, and a third CNG tank may be positioned laterally across frame rails 30 (e.g., at the upper ends of the two generally-vertical CNG tanks, across the tops of the two generally-vertical CNG tanks, etc.).

Referring again to FIGS. 6-8, chassis 20 includes a first lateral side and a second lateral side. By way of example, the first lateral side of chassis 20 may be the right side of concrete mixer truck 10 (e.g., when an operator is sitting in cab 50 and positioned to drive concrete mixer truck 10, etc.), and the second lateral side of chassis 20 may be the left side of concrete mixer truck 10 (e.g., when an operator is sitting in cab 50 and positioned to drive concrete mixer truck 10, etc.). According to the exemplary embodiment shown in FIGS. 6-8, first CNG tank 150 and second CNG tank 160 are positioned on opposing lateral sides of chassis 20. By way of example, first CNG tank 150 may be positioned on the first lateral side of chassis 20, and second CNG tank 160 may be positioned on the second lateral side of chassis 20. According to an alternative embodiment, first CNG tank 150 and second CNG tank 160 are positioned on only one of the left side and the right side of concrete mixer truck 10 (i.e., first CNG tank 150 and second CNG tank 160 may be both positioned on the same lateral side of concrete mixer truck 10, etc.).

According to an exemplary embodiment, concrete mixer truck 10 having first CNG tank 150 and second CNG tank 160 positioned in a generally-vertical orientation on opposing lateral sides of chassis 20 may have a reduced (i.e., shorter, etc.) wheelbase relative to concrete mixing vehicles having CNG tanks located in other orientations. In one embodiment, first CNG tank 150 and second CNG tank 160 have a circular cross section with a diameter of 26 inches. The longitudinal space claim of first CNG tank 150, second CNG tank 160, and covers 120 may be approximately 30 inches. Accordingly, fuel system 90 has a reduced longitudinal space claim (e.g., an 18 inch reduction in longitudinal space claim, etc.). Concrete mixer truck 10 having a fuel system 90 with a reduced longitudinal space claim has a reduced wheelbase (e.g., 196 inches, etc.), according to an exemplary embodiment. In other embodiments, fuel system 90 having a reduced longitudinal space claim may be implemented on concrete mixer vehicles that have a maximum allowable wheelbase (i.e., those mixer vehicles where extending the wheelbase to accommodate CNG fuel tanks is not an acceptable option, etc.).

In one embodiment, first CNG tank 150 and second CNG tank 160 are elongate. By way of example, first CNG tank 150 and second CNG tank 160 may have lengths that are greater than their widths. In one embodiment, first CNG tank 150 and second CNG tank 160 have a circular cross section with a diameter of 26 inches and a length of 80 inches. First CNG tank 150 and second CNG tank 160 may each have an upper end and a lower end. In one embodiment, first CNG tank 150 and second CNG tank 160 are boss-mounted at the upper ends and the lower ends thereof. The lower ends of first CNG tank 150 and second CNG tank 160 may be fixed, and the upper ends thereof may be mounted with floating joints. Such floating joints may accommodate an extension (i.e., growth, etc.) of the CNG tanks (e.g., 0.375 inches, etc.) that may occur during filling or when the tanks are pressurized. As shown in FIGS. 6-9, the lower ends of first CNG tank 150 and second CNG tank 160 are directly coupled to a rear pedestal 110 with a pair of support brackets 170. The upper ends of first CNG tank 150 and second CNG tank 160 are directly coupled to drum drive transmission 130 with an intermediate superstructure 180. Support brackets 170 and intermediate superstructure 180 hold first CNG tank 150 and second CNG tank 160 in a generally-vertical orientation relative to frame rails 30, according to an exemplary embodiment. In other embodiments, at least one of first CNG tank 150 and second CNG tank 160 are otherwise coupled to rear pedestal 110 (e.g., with a plurality of straps or bands, etc.). As shown in FIG. 7, first CNG tank 150 and second CNG tank 160 straddle drum drive transmission 130.

According to an exemplary embodiment, fuel system 90, including first CNG tank 150 and second CNG tank 160 positioned in a generally-vertical orientation, includes a first shutoff valve coupled to the lower end of first CNG tank 150 and a second shutoff valve coupled to the lower end of second CNG tank 160. Fuel system 90 having shutoff valves positioned at the lower ends of first CNG tank 150 and second CNG tank 160 facilitates isolation of the CNG tanks by an operator standing alongside concrete mixer truck 10. In other embodiments, a first shutoff valve is coupled to the upper end of first CNG tank 150, and a second shutoff valve is coupled to the upper end of second CNG tank 160. In either position, the shutoff valves may be manually operable (e.g., with a handle, etc.) or electrically actuated (e.g., with a solenoid valve, etc.). By way of example, the shutoff valves may be electrically actuated by an operator standing alongside concrete mixer truck 10 using a control system that includes a button or other user interface.

Referring still to FIGS. 7-8, first CNG tank 150 and second CNG tank 160 are elongate and each define a central axis. As shown in FIGS. 7-8, first CNG tank 150 defines a central axis 152, and second CNG tank 160 defines a central axis 162. In one embodiment, central axis 152 extends along a centerline of first CNG tank 150 and central axis 162 extends along a centerline of second CNG tank 160. As shown in FIGS. 7-8, first CNG tank 150 and second CNG tank 160 include tubular middle portions. Central axis 152 may extend along the centerline of the tubular middle portion of first CNG tank 150, and central axis 162 may extend along the centerline of the tubular middle portion of second CNG tank 160. Central axis 152 may extend through the mounting bosses of first CNG tank 150, and central axis 162 may extend through the mounting bosses of second CNG tank 160.

As shown in FIGS. 7-8, central axis 152 of first CNG tank 150 is angularly offset relative to central axis 162 of second CNG tank 160. By way of example, central axis 152 may be angularly offset relative to central axis 162 in a plane that includes both central axis 152 and central axis 162. Central axis 152 may be angularly offset relative to central axis 162 in the front or rear plan views of fuel system 90 or concrete mixer truck 10. In one embodiment, central axis 152 is angularly offset about 15 degrees (e.g., between 12 and 18 degrees, etc.) from central axis 162. First CNG tank 150 and second CNG tank 160 may have upper ends that are tipped inward (e.g., closer to a lateral centerline of chassis 20, etc.) relative to their lower ends. Such an arrangement may reduce loads experienced by intermediate superstructure 180 and provide a compact mounting arrangement for first CNG tank 150 and second CNG tank 160.

According to the exemplary embodiment shown in FIGS. 6-9, first CNG tank 150 and second CNG tank 160 are positioned behind mixing drum 70 (i.e., first CNG tank 150 and second CNG tank 160 are positioned further from front ends 32 of frame rails 30 than the base portion of mixing drum 70, etc.). As shown in FIGS. 6-9, the concrete mixer vehicle is a front-discharge concrete truck that includes cab 50 and engine 62 coupled to front ends 32 and rear ends 34 of frame rails 30, respectively. First CNG tank 150 and second CNG tank 160 are positioned forward of engine 62. By way of example, first CNG tank 150 and second CNG tank 160 may be positioned between engine 62 and the base portion of mixing drum 70. According to an alternative embodiment, concrete mixer truck 10 is a rear discharge concrete truck that includes cab 50 coupled to front ends 32 of frame rails 30. Engine 62 may be coupled to frame rails 30 in front of cab 50, beneath cab 50, or in still another location. In one embodiment, first CNG tank 150 and second CNG tank 160 are positioned behind cab 50. By way of example, first CNG tank 150 and second CNG tank 160 may be positioned between cab 50 and a base portion (i.e., the front portion, the portion coupled to a drum drive transmission, etc.) of mixing drum 70.

As shown in FIGS. 6-9, drum drive transmission 130 is coupled to the upper portion of rear pedestal 110. Lower ends of first CNG tank 150 and second CNG tank 160 are directly coupled to rear pedestal 110 with support brackets 170. In other embodiments, concrete mixer truck 10 is a rear discharge concrete truck, and mixing drum 70 is coupled to frame rails 30 with a front drum pedestal and a rear drum pedestal. Drum drive transmission 130 is coupled to the upper portion of the front drum pedestal, and lower ends of first CNG tank 150 and second CNG tank 160 are directly coupled to the front drum pedestal with support brackets 170. For either a front or a rear discharge concrete truck, upper ends of the first CNG tank 150 and the second CNG tank 160 may be directly coupled to the drum drive transmission with intermediate superstructure 180.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the elements of the systems and methods as shown in the exemplary embodiments are illustrative only. Although only a few embodiments of the present invention have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. As another example, the position of elements may be reversed or otherwise varied and the nature or number of discrete elements or positions may be altered or varied. Accordingly, all such modifications are intended to be included within the scope of the disclosure. The order or sequence of any process or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A concrete mixer vehicle, comprising:
    a chassis including a frame member extending in a generally-horizontal direction;
    an engine coupled to the chassis;
    a drum;
    a drum drive transmission coupled to the drum;
    a drum pedestal having a lower portion that is coupled to the frame member and an upper portion that is coupled to the drum drive transmission; and
    a CNG tank coupled to the engine and configured to provide fuel thereto, wherein the CNG tank is positioned in a generally-vertical orientation relative to the frame member, wherein the CNG tank has a length measured along the generally-horizontal direction, a width measured across the generally-horizontal direction, and a height measured along a central axis, wherein the height is greater than the width and greater than the length such that the CNG tank is elongate, the height and the central axis disposed in the generally-vertical direction, wherein the CNG tank has an upper end and a lower end, wherein the lower end of the CNG tank is directly coupled to the drum pedestal with a support bracket, wherein the upper end of the CNG tank is directly coupled to the drum drive transmission with an intermediate superstructure, wherein the support bracket and the intermediate superstructure are disposed in a generally perpendicular orientation relative to the central axis, wherein the support bracket and the intermediate superstructure have distal ends that attach directly to the lower end and the upper end of the CNG tank, respectively.

2. The concrete mixer vehicle of claim 1, further comprising a second CNG tank coupled to the engine and configured to provide fuel thereto, wherein the second CNG tank is positioned in a generally-vertical orientation relative to the frame member.

3. The concrete mixer vehicle of claim 2, wherein the first CNG tank is positioned on a first lateral side of the chassis and the second CNG tank is positioned on a second lateral side of the chassis.

4. The concrete mixer vehicle of claim 3, wherein the second CNG tank is elongate and has a second upper end and a second lower end, wherein the second lower end of the second CNG tank is directly coupled to the drum pedestal with a second support bracket, and wherein the second upper end of the second CNG tank is directly coupled to the drum drive transmission with the intermediate superstructure.

5. The concrete mixer vehicle of claim 4, wherein the first CNG tank and the second CNG tank each define a central axis, wherein the central axis of the first CNG tank and the central axis of the second CNG tank are positioned in a generally-vertical orientation relative to the frame member.

6. The concrete mixer vehicle of claim 5, wherein the central axis of the first CNG tank is angularly offset relative to the central axis of the second CNG tank.

7. The concrete mixer vehicle of claim 6, wherein the central axis of the first CNG tank is angularly offset about 15 degrees relative to the central axis of the second CNG tank.

8. The concrete mixer vehicle of claim 6, wherein the drum is a concrete drum having a base portion coupled to the drum drive transmission, wherein the first CNG tank and the second CNG tank are positioned behind the concrete drum.

9. The concrete mixer vehicle of claim 1, wherein the lower end of the CNG tank is fixedly coupled to the drum pedestal with the support bracket and wherein the intermediate superstructure is configured to accommodate a change in length of the CNG tank.

10. A front discharge concrete mixer vehicle, comprising:
a chassis including a frame member extending in a generally-horizontal direction and having a front end and a rear end;
a concrete mixing drum having an opening at the front end of the chassis and coupled to the frame member with a front drum pedestal and a rear drum pedestal;
a drum drive transmission coupled to the concrete mixing drum and coupled to an upper portion of the rear drum pedestal;
an operator cab positioned at the front end of the chassis;
an engine positioned at the rear end of the chassis; and
a CNG tank coupled to the engine and configured to provide fuel thereto, wherein the CNG tank is positioned in a generally-vertical orientation relative to the frame member, wherein the CNG tank has a length measured along the generally-horizontal direction, a width measured across the generally-horizontal direction, and a height measured along a central axis, wherein the height is greater than the width and greater than the length such that the CNG tank is elongate, the height and the central axis disposed in the generally-vertical direction, wherein the CNG tank has an upper end and a lower end, wherein the lower end of the CNG tank is directly coupled to the drum pedestal with a support bracket, wherein the upper end of the CNG tank is directly coupled to the drum drive transmission with an intermediate superstructure, wherein the support bracket and the intermediate superstructure are disposed in a generally perpendicular orientation relative to the central axis, wherein the support bracket and the intermediate superstructure have distal ends that attach directly to the lower end and the upper end of the CNG tank, respectively.

11. The front discharge concrete mixer vehicle of claim 10, wherein the CNG tank is positioned forward of the engine.

12. The front discharge concrete mixer vehicle of claim 11, wherein the CNG tank is positioned between the engine and a base portion of the concrete mixing drum.

13. The concrete mixer vehicle of claim 10, wherein the lower end of the CNG tank is fixedly coupled to the rear drum pedestal with the pair of support brackets and wherein the intermediate superstructure is configured to accommodate a change in length of the CNG tank.

* * * * *